United States Patent

[11] 3,568,197

[72] Inventor Harold Dean Cubley
 Houston, Tex.
[21] Appl. No. 882,577
[22] Filed Dec. 5, 1969
[45] Patented Mar. 2, 1971
[73] Assignee the United States of America as represented by the Administrator of the National Aeronautics and Space Administration

[54] ANTENNA ARRAY PHASE QUADRATURE TRACKING SYSTEM
 9 Claims, 6 Drawing Figs.
[52] U.S. Cl. .................................................. 343/100,
 325/16, 325/23, 325/369, 343/117, 343/176
[51] Int. Cl. .................................................. G01s 3/46
[50] Field of Search .......................................... 325/369,
 302, 4, 16, 23; 343/117 (A), 16 (SD), 100 (SAT), 176

[56] References Cited
 UNITED STATES PATENTS
 2,951,152 8/1960 Sichak et al. ............... (343/117AUX)
 2,975,275 3/1961 Adams ....................... (343/117AUX)
 3,104,389 9/1963 Ward .......................... (343/120UX)
 3,140,456 7/1964 Lassen et al. .............. (343/16SDUX)
 3,394,374 7/1968 Weiss ........................ 343/117(A)X Primary Examiner—Rodney D. Bennett, Jr.
Assistant Examiner—Richard E. Berger
Attorneys—Marvin J. Marnock, Marvin F. Matthews and G. T. McCoy ABSTRACT: The system input signals on two separate antenna elements in an antenna array are combined to form two processed signals with one such signal representing the absolute value of the sum of the two antenna signals and the other representing the absolute value of the difference of the signals. The two processed signals are time multiplexed through a radiofrequency switch operating at 10-millisecond intervals to form a single input signal to a receiver which in turn detects amplitude modulation in the multiplexed signal and forms an amplitude dependent signal to control a variable phase shifter circuit. The latter circuit automatically alters the relative phase between the two antenna signals whenever any amplitude modulation exists in the multiplex signal. Relative phase shift of the antenna signals stops when the absolute value of the two processed output signals are equal to each other which occurs only when the two antenna signals are in phase quadrature. The described procedure may be employed for any number of antennas connected in parallel to provide substantially omnidirectional antenna coverage and the time multiplexing and signal processing operations may be performed with stripline circuitry and techniques. For transmitting, a phase detector is employed to detect the phase modulation in the received multiplexed signal to establish and switch to the antenna in the array which will provide the greatest system gain for use while transmitting.

The invention described herein was made by an employee of the United States Government and may be manufactured and used by or for the government for governmental purposes without the payment of any royalties thereon or therefor.

PATENTED MAR 2 1971    3,568,197
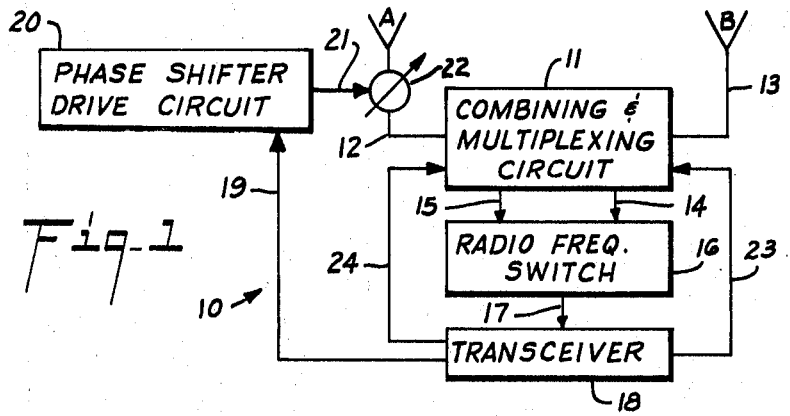
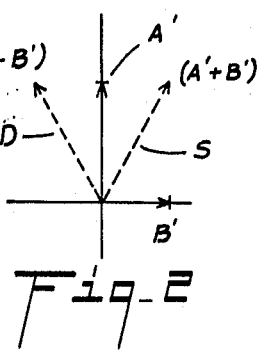
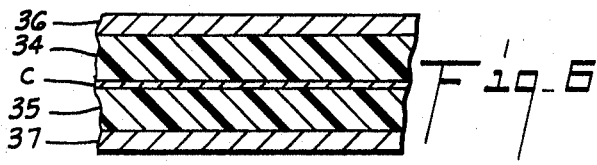
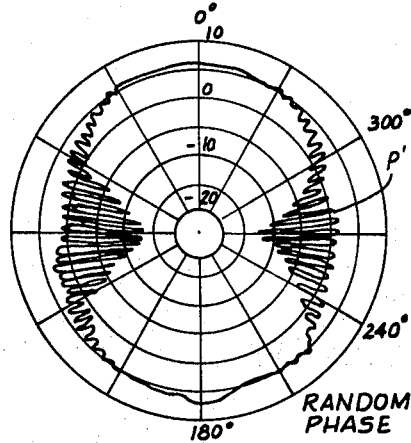
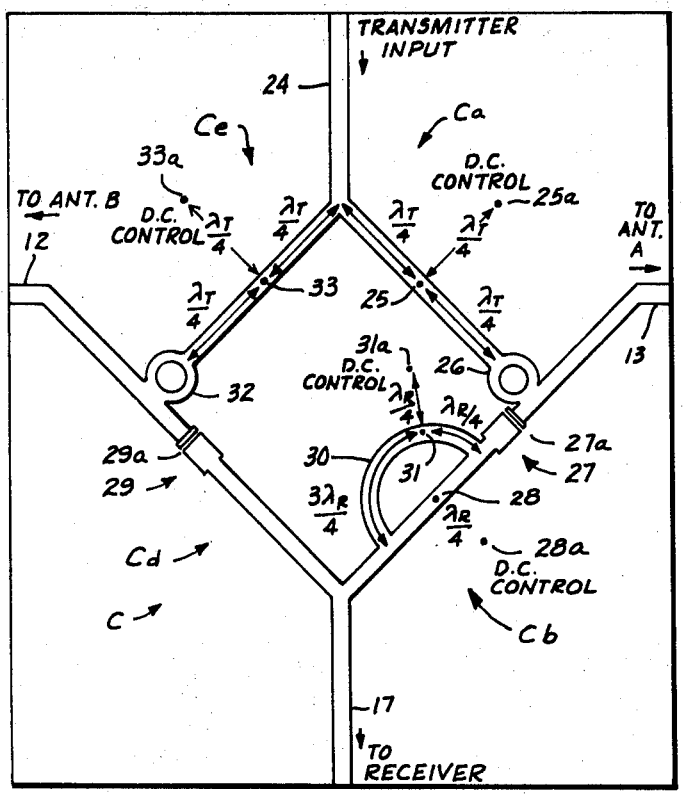
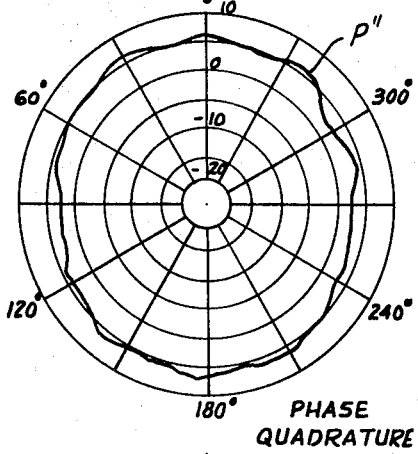
INVENTOR.
HAROLD DEAN CUBLEY
BY
ATTORNEYS

ANTENNA ARRAY PHASE QUADRATURE TRACKING SYSTEM

BACKGROUND OF THE INVENTION

1. Field of the Invention

The present invention relates generally to antenna systems employed for the reception and propagation of radio signals. More specifically, the present invention relates to an improved antenna system for use in space communications with such system automatically adjusting the relative phase difference between signals received on relatively widely spaced antenna elements located in an antenna array to thereby reduce or eliminate interference regions between the antenna elements and also for automatically switching to the antenna element producing the maximum system gain when the system is to be employed for transmitting purposes.

2. Brief Description of the Prior Art

Essentially omnidirectional S-band antenna coverage is required for communications between earthbound personnel and astronauts in a space vehicle traveling in outer space. The S-band omnidirectional antenna system employed on the Apollo command module includes four flush-mounted, cavity-backed helices which provide voice and telemetry capability between the Manned Space Flight Network and the Apollo command module. Interference regions are normally associated with the widely spaced antennas of the command module array and it has been necessary to manually switch the communications system to the appropriate antenna in the parallel-connected system for obtaining optimum operating characteristics while transmitting and receiving.

It will be readily appreciated that the requirement for manually controlling antenna selection is undesirable in that it calls for substantially continuous monitoring and switching. In addition, communications are often lost during the time required for the operator to manually switch to each of the separate antennas in the array as he attempts to locate the antenna element having the best performance characteristics.

The prior art has suggested means other than manual switching for eliminating or reducing the interference regions between widely spaced antenna arrays. Such means include the use of individual receivers for each antenna element of the array or the use of phase-sensitive circuits in each antenna feedline to provide an output that is proportional to the difference between the phase of the signal on the antenna and the phase of a known reference signal. The output in the latter system is employed to automatically adjust the phase of the antenna and reduce the interference region.

Systems or techniques which require the use of a large number of receivers or transmitters are not well suited for space application where weight and volume considerations are of great concern. In this regard, the prior-art systems which employ automatic phase tracking have generally required complex components and techniques which are not only expensive but have in general required relatively large system components which limit the systems to earth-based applications.

In general, the prior art fails to disclose a relatively inexpensive, lightweight, direct system which can automatically and dependably adjust the phase relationship between input signals appearing on widely spaced elements in an antenna array to eliminate interference regions between the elements. Moreover, none of the prior art has suggested means whereby such a system may also be employed for automatically switching to the optimum antenna element in an array for transmitting purposes with the selection of the appropriate antenna being based upon the amplitude and phase relationship of the signals received by the antennas.

SUMMARY OF THE INVENTION

The antenna array phase quadrature tracking system of the present invention is adapted to automatically adjust the phase relationship between the input signals appearing on two widely spaced, parallel connected, antenna elements employed in an antenna array for the purpose of delivering the optimum signal to a transceiver employed in conjunction with the antenna system. The antenna system of the present invention is also designed to be employed for transmitting purposes whereupon it will automatically select the antenna element in the array which will give the maximum system gain for communications between the system associated with the antenna array and a remote receiving station. An example of such dual purpose application is that of communication between an earthbound station and a spacecraft traveling in outer space. With the antenna system of the present invention, manual switching is eliminated by employing automatic signal phasing in a parallel antenna array. The result is substantially omnidirectional antenna coverage with the use of only a minimum number of antenna elements in the array.

In its basic form, the present invention combines the input signals appearing on two physically separated antenna elements in a single array to form two processed signals which represent respectively the absolute values of the phasor sum and difference of the two signals. The two processed signals are then time multiplexed through a radiofrequency switch at 10-millisecond intervals to form a single input signal which forms the input to an amplitude detector in a receiver. The amplitude detector senses amplitude variations between the two processed signals forming the multiplexed signal and provides an output control signal which is employed as part of a feedback loop to control a variable phase shifter circuit which in turn automatically alters the relative phase of the two antenna signals until no amplitude modulation exists in the multiplexed signal. Amplitude modulation ceases in the multiplexed system only when the two antenna signals are in phase quadrature so that the system continuously adjusts the relative phase of the two antenna signals to automatically maintain them in phase quadrature.

The radiofrequency switching operation in the multiplexing stage creates a phase modulation of the two processed signals which is dependent upon the relative amplitude of the signals received on each of the antenna elements. A phase modulation detector is employed to automatically select the antenna element having the greatest signal amplitude to thereby provide maximum system gain when the antenna array is being employed for transmitting purposes.

The signal combining and multiplexing operations including the radiofrequency switching is accomplished by means of a stripline circuit which reduces the number of required components in a system and also reduces the weight and volume of the composite system thus lending the invention to use in situations such as space travel where weight and volume restrictions on equipment are critical factors.

From the foregoing as well as from the following specification drawings and related claims, it may be seen that a primary object of the principle of the present invention is to provide an automatic system for optimizing the reception and transmitting characteristics of antennas employed in an antenna array. In addition, it will also be appreciated that the apparatus and method of the present invention enables the attainment of the foregoing objective in a straightforward, inexpensive and dependable manner with a significant reduction in volume and weight of the system components.

BRIEF DESCRIPTION OF THE DRAWINGS

FIG. 1 is a schematic block diagram of the antenna array phase quadrature tracking system of the present invention employed in a two antenna element array;

FIG. 2 is a phasor diagram illustrating the relative amplitude and phase relationship between the input signals on the two antenna elements illustrated in FIG. 1 when such signals are in phase quadrature;

FIG. 3 is a graphic illustration of the roll plane radiation pattern for two parallel omniantennas without automatic phasing operating at 2,106.4 mHz.;

FIG. 4 is a graphic illustration of the roll plane radiation pattern for two parallel omniantennas in phase quadrature operating at 2,106.4 mHz.;

FIG. 5 is a schematic representation of the hybrid switch and multiplexer circuit configuration employed in the antenna array phase quadrature tracking system of the present invention; and FIG. 6 is a cross-sectional view illustrating the composite structure of the hybrid switch and multiplexer circuit stripline construction illustrated in FIG. 5.

DESCRIPTION OF THE PREFERRED EMBODIMENTS

With reference to FIG. 1 of the drawings, the antenna system of the present invention indicated generally at 10 includes a processing circuit 11 connected by suitable transmission lines 12 and 13 to two physically spaced, parallel antenna elements A and B respectively which form an antenna array. The processing circuit 11 includes appropriate circuitry for combining the signals A' and B' received by the antennas A and B respectively to form two processed output signals on lines 14 and 15 with the processed output signals on lines 14 and 15 with the processed signal on line 14 being the phasor sum of the two antenna signals (A'+B') and the signal on line 15 being the difference signal (A'−B').

The signals (A'+B') and (A'−B') are time multiplexed through a radiofrequency (RF) switch 16 which alternately forms the processed output of (A'+B') and (A'−B') on an output line 17. In the preferred form of the invention, the RF switch 16 operates at approximately 10 milliseconds. It will be apparent that the multiplexed signal on line 17 will vary in amplitude so long as the absolute value of (A'+B') is not equal to the absolute value of (A'−B'), i.e. $|A'+B'| \neq |A'-B'|$. This amplitude modulation is detected by an amplitude detector circuit included as part of a transceiver 18. The output signal from the amplitude detector is formed on an output control line 19 and is employed to control the operation of a phase shifter drive circuit 20. The drive circuit 20 forms an output signal on a line 21 for controlling a phase shifter circuit 22 employed to vary the phase of the antenna signal A' with respect to the phase of the antenna signal B'.

For transmitting usage, the transceiver 18 also includes a phase detection circuit designed to form an output signal on a line 23 which is employed to automatically switch a transmission line 24 to antenna A or antenna B depending upon which of these two antennas received the maximum amplitude signal during the previous receiving period. The selection criterion is established from the fact that the RF switching during the multiplexing operation creates a phase modulated signal on the line 17 with the extent of the phase modulation being dependent upon the relative amplitudes of the signals received on antennas A and B. With reference to FIG. 2, it may be seen that the amount of phase modulation will vary from approximately 0° when the amplitude of the antenna signal A' is very much greater that that of B', i.e. $|A'| >> |B'|$ to 180° when the reverse relationship exists i.e. $|B'| << |A'|$. This information may be employed to select the preferred antenna element for transmitting purposes. Thus, when the amplitude of the received signal B' is the greatest, antenna B is automatically switched into the transceiver 18 to act as the transmitting antenna. Similarly, if the amplitude of the signal appearing on antenna A is the greatest, it is automatically employed as the transmitting antenna. It will of course be understood that the antenna with the highest amplitude signal received from a remote station is also the preferred antenna for transmitting purposes because of its favorable orientation with respect to the remote station.

In theory, the antenna system of the present invention is designed with the initial principle in mind that the signals A' and B' received by the antennas A and B respectively from the same remote broadcasting source are not necessarily related to each other either with respect to their phase or amplitude. This is particularly so when the two antennas are widely spaced from each other in the antenna array. When the two antenna signals A' and B' are fed into the hybrid switch and multiplexer circuitry 11, they are processed as previously indicated to produce the sum signal (A'+B') and the difference signal (A'−B'). With one major exception, the absolute value of the sum signal (A'+B') is not equal to the absolute value of the difference signal (A'−B') which produces amplitude modulation in the output signal appearing on line 17. The major exception to this general condition exists in the situation illustrated in the phasor diagram of FIG. 2 where the signals A' and B' are in phase quadrature so that the sum signal $|A'+B'|$ indicated by the phasor S and the difference signal $|A'-B'|$ indicated by the phasor D are equal to each other in magnitude. From the foregoing, it will be understood that the amplitude detector in the transceiver 18 will sense amplitude modulation between the sum and difference signals appearing on the line 17 at any time when the signals A' and B' are out of phase quadrature. However, when such signals are in phase quadrature, the sum and difference signals have the same amplitude and there is no amplitude modulation of the signal appearing on the output line 17.

The phase shifter drive circuitry is controlled by the output signal appearing on the line 19 to provide an output signal on the line 21 which adjusts the phase changer 22 such that the signal A' either leads or lags the signal B' by 90°, depending upon which condition is desired. Under operating conditions, it will be evident from the foregoing that the phase shifter 22 will continuously maintain the signals A' and B' in phase quadrature to thereby provide an improved input signal to the transceiver 18.

While optimum performance characteristics are obtained when the signals A' and B' are exactly in phase, the phasing of the signals to phase quadrature also produces improved operating characteristics with relatively little degradation in received signal strength. Maximum degradation occurs when the absolute value of A' is exactly equal to the absolute value of B' and in this situation, actual experimental data has indicated that the maximum degradation in received signal strength will be only 1.6 decibels (db) as compared to an in phase system. For any other combination of signal magnitudes for the signals A' and B', the degradation will be much less than 1.6 db and will approach 0 db when the magnitude of either A' or B' approaches 0.

FIG. 3 illustrates the recorded roll plane antenna pattern at the receiver frequency for two Apollo S-band omnidirectional antennas located on opposite sides of the spacecraft. The antennas producing the pattern P' were connected in parallel and employed without the automatic phasing system of the present invention. At a receiving frequency of 2,106.4 mHz., the roll plane pattern of FIG. 3 illustrates that the two antennas have optimum coverage at 0° and 180° with maximum degradation and inferior coverage at 90° and 270°. FIG. 4 illustrates the roll plane radiation pattern P'' for two similar antennas connected in parallel in a system which employs the automatic phasing of the present invention. At the same receiving frequency of 2,106.4 mHz., the two antennas having the characteristics depicted in FIG. 4 exhibit significantly improved omnidirectional coverage. By way of example, in an antenna system of the present invention it was noted that the maximum null depth in the spacecraft's roll plane at both the transmit and receive frequencies was 6 db or less.

FIG. 5 illustrates a stripline circuit C having its overlying layers removed for descriptive purposes. The circuit C forms a part of the present invention and is designed to perform the combining, multiplexing and antenna switching functions described with reference to components 11 and 16 of FIG. 1. The circuit C includes four external circuit connections which connect to lines 12, 13, 17 and 24 as illustrated and four internal branches Ca, Cb, Cd and Ce formed of any suitable conductive material. The stripline conductor branch Ca includes a pin diode switch 25 and a directional coupler 26. Branch Cb includes a frequency-selective coupler 27 with a gap 27a which is varied as required to pass signals only within a predetermined frequency range or pass band. Branch Cb also includes a pin diode switch 28, a frequency-selective coupler 29 having a gap 29a and a semicircular phase inverter 30 which also includes a pin diode switch 31. Branch Cd includes a frequency-selective coupler 29 having a gap 29a and branch Ce is provided with a directional coupler 32 and a pin diode switch 33. The pin diode switches may be model No. HPA 35-36 made by the Hewlett Packard Company or the equivalent. Each of the pin diode switches 25, 28, 31, and 33 is associated with and controlled by DC controls 25a, 28a, 31a and 33a respectively.

In constructing the stripline circuitry C, the lengths of the various conducting paths correspond to the transmitting and receiving frequencies with the lengths indicated as $\lambda_R$ being the wavelength of the signal employed at the receive frequency and $\lambda_T$ being the wavelength of the signal employed at the transmit frequency. The terms $\lambda_{T/}4$ and $\lambda_{R/}4$ represent quarter-wavelength distances and the terms $3\lambda_{T/}4$ and $3\lambda_{R/}4$ represent ¾-wavelength distances.

In the operation of the circuit C, pin diode switch 31 is triggered by its associated DC control 31a at 10-millisecond intervals to periodically short the semicircular conducting path 30 to ground. Pin diode 28 is maintained 180° out of phase with diode 31 so that diode 28 conducts when diode 31 is in a nonconductive state and is in a nonconductive state when diode 31 is conductive. The two frequency-selective couplers 27 and 29 pass signals in the receive frequency range and block the signals in the transmit frequency to isolate the transceiver 18 from the latter signals while conveying received signals directly to the transceiver. The transmitter line 24 is similarly isolated from incoming signals at the receive frequency by means of the two directional couplers 26 and 32. The couplers 26 and 32 which are conventional permit passage of the transmitted signals only from the transceiver 18 to the antenna elements A or B. Information input to the circuit C from the phase detector line 23 is employed to control the DC controls 25a and 33a to open or close the appropriate diode switch 25 or 33 respectively for directing the transmitted signal to the antenna element A or B having the highest amplitude receive signal.

The antenna signal A' travels through branch Cd of the circuit until it reaches the junction of branch Cd and branch Cb. At the junction, the antenna signal A' combines with the antenna signal on the branch Cb and the resultant signal is fed through line 17 to the transponder. The signal on branch Cb at the junction with branch Cd is changed from +B' to −B' at 10-millisecond intervals by alternately biasing DC control points 28a and 31a at this frequency. With the appropriate DC biasing voltage at the control points 28a and 31a, pin diode 28 is conductive and pin diode 31 is nonconductive causing the signal B' to travel a direct path through the branch Cb to the junction with branch Cd. In the reverse situation however with the diode 28 forming an open circuit in the stripline conductor of branch Cb and with diode 31 forming a closed pathway, the signal B' travels through the semicircular loop 30 which increases the travel path of the signal by one-half wavelength. By this means, the signal B' appears at the junction 180° out of phase every 10 milliseconds, corresponding to a −B' signal. The resultant signal on the line 17 is thus (A'+B') for 10 milliseconds followed by a signal of (A'−B') for 10 milliseconds. Thus, the hybrid switch and multiplexer illustrated in FIG. 5 forms the sum and difference signals and multiplexes these signals on the line 17 which forms the input to the amplitude detector in the transponder 18. For this reason it will be understood that the two lines 14 and 15 illustrated in FIG. 1 are employed merely for descriptive purposes since the sum and difference signals do not coexist simultaneously on different lines.

FIG. 6 is a cross section illustrating an exemplary construction of the stripline circuitry C. The circuit C is sandwiched between two tetrafluoroethylene (TFE) dielectric plates 34 and 35 which in turn are positioned between two overlying copper sheets 36 and 37. The use of the stripline circuitry illustrated in FIGS. 5 and 6 greatly reduces the weight and volume normally employed for performing the combining, multiplexing and switching functions employed in the present invention.

The foregoing disclosure and description of the invention is illustrative and explanatory thereof, and various changes in the size, shape and materials as well as in the details of the illustrated construction may be made within the scope of the appended claims without departing from the spirit of the invention. Thus, by way of example rather than limitation, it should be understood that the invention may be extended to any number of antenna elements even though it has been specifically described with only two elements. The specific circuitry employed in performing the multiplexing and combining functions described with reference to the present invention may also be modified without departing from the present invention.

I claim:

1. An antenna system for use with a plurality of antenna elements comprising:
   a. Processing means for combining two antenna signals received from two of said plurality of antennas to provide a first processed signal representing the sum of said two antenna signals and a second processed signal representing the difference of said two antenna signals;
   b. Amplitude detecting means connected with said first and second processed signals for detecting an amplitude difference between said first and second processed signals and for forming a first control signal representing the presence or absence of said amplitude difference;
   c. Phase-shifting means controllable by said first control signal for changing the phase difference between said two antenna signals;
   d. Phase-detecting means for detecting a phase difference between said first and second processed signals and for forming a second control signal based on said phase difference indicating which of said two antenna signals has the greatest amplitude; and
   e. Automatic switching means controllable by said second control signal for switching a transmitter to the antenna having the maximum amplitude antenna signal.

2. An antenna system for use with a plurality of antenna elements comprising:
   a. Processing means for combining two antenna signals received from two of said plurality of antennas to provide a first processed signal representing the sum of said two antenna signals and a second processed signal representing the difference of said two antenna signals;
   b. Amplitude-detecting means connected with said first and second processed signals for detecting an amplitude difference between said first and second processed signals and for forming a first control signal representing the presence or absence of said amplitude difference;
   c. Phase-shifting means controllable by said first control signal for changing the phase difference between said two antenna signals, said phase-shifting means including means for altering the phase difference between said two antenna signals until said two processed signals have the same amplitude;
   d. Phase-detecting means for detecting a phase difference between said first and second processed signals and for forming a second control signal based on said phase difference and which of said two antenna signals has the greatest amplitude; and
   e. Automatic switching means controllable by said second control signal for switching a transmitter to the antenna having the maximum amplitude antenna signal.

3. The antenna system as defined in claim 2 further including multiplexing means for time multiplexing said first and second processed signals to form a multiplexed signal which is alternately said first and then said second processed signals.

4. The antenna system as defined in claim 3 further including a transceiver connected with said antenna system for receiving and transmitting through said antennas.

5. An antenna system for use with a plurality of antenna elements comprising:
   a. Processing means for combining two antenna signals received from two of said plurality of antennas to provide a first processed signal representing the sum of said two antenna signals and a second processed signal representing the difference of said two antenna signals;
   b. Amplitude-detecting means connected with said first and second processed signals for detecting an amplitude difference between said first and second processed signals and for forming a first control signal representing the presence or absence of said amplitude difference;
   c. Phase-shifting means controllable by said first control signal for changing the phase difference between said two antenna signals;
   d. A stripline circuit configuration having a plurality of conducting branches;
   e. A first conducting branch of said strip line circuit connected to one of said two antennas;
   f. A second conducting branch of said strip line circuit connected between the other of said two antennas and said first branch to form a signal-combining junction with said first branch;
   g. Said first branch including two selectively operable conducting paths with one of said paths being a half wavelength longer than said other path whereby said antenna signal traveling over said shorter path is 180° out of phase with said signal traveling over said longer path at said junction; and
   h. Means for alternately operating said first and second conducting paths to form and time multiplex said two processed signals at said junction.

6. The antenna system as defined in claim 5 wherein said stripline circuit configuration further includes means for connecting a transmitter to one of said two antennas and means for isolating signals received by said antenna from said transmitter.

7. The antenna system as defined in claim 6 further including:
   a. Phase-detecting means for detecting a phase difference between said first and second processed signals and for forming a second control signal based on said phase difference and which of said two antenna signals has the greatest amplitude; and
   b. Automatic switching means controllable by said second control signal for switching a transmitter to the antenna having the maximum amplitude antenna signal.

8. The antenna system as defined in claim 4 wherein said processing means includes:
   a. A stripline circuit configuration having a plurality of conducting branches;
   b. A first conducting branch of said stripline circuit connected to one of said two antennas;
   c. A second conducting branch of said stripline circuit connected between the other of said two antennas and said first branch to form a signal-combining junction with said first branch;
   d. Said first branch including two selectively operable conducting paths with one of said paths being a half wavelength longer than said other path whereby said antenna signal traveling over said shorter path is 180° out of phase with said signal traveling over said longer path at said junction; and
   e. Means for alternately operating said first and second conducting paths to form and time multiplex said two processed signals at said junction.

9. The antenna system as defined in claim 8 wherein said stripline circuit configuration further includes means for connecting a transmitter to one of said two antennas and means for isolating signals received by said antenna from said transmitter.